No. 810,750. PATENTED JAN. 23, 1906.
L. G. HARPER.
MILKING DEVICE.
APPLICATION FILED MAY 27, 1905.

Witnesses,
Robert Everitt,

Inventor,
Lewis G. Harper.
By James L. Norris
Att'y

UNITED STATES PATENT OFFICE.

LEWIS GOODWIN HARPER, OF WESTCHESTER, PENNSYLVANIA.

MILKING DEVICE.

No. 810,750.　　　　Specification of Letters Patent.　　　Patented Jan. 23, 1906.

Application filed May 27, 1905. Serial No. 262,677.

*To all whom it may concern:*

Be it known that I, LEWIS GOODWIN HARPER, a citizen of the United States, residing at Westchester, in the county of Chester and State of Pennsylvania, have invented new and useful Improvements in Milking Devices, of which the following is a specification.

This invention relates to a milking device embodying a structure having an operation simulating the human hand and intended to overcome the disadvantages and injurious effects arising from the use of that class of cow-milking machines and devices embodying a suction organization.

The cow-milking device embodying the features of the invention is readily yieldable, as well as contractible and expansible, and operates to grasp teats of various dimensions and exert a pressure on the latter similar to that of the fingers of the hand to effect a thorough milking and stripping, if required, of the udder without the least inconvenience or annoyance to the cow to which the device is applied. The operation of the milking device is partially automatic to alternately squeeze and relieve pressure from the teat operated upon, and, furthermore, one, two, or more of the devices may be applied to teats and actuated to regularly draw the milk down to and through oppositely-positioned teats after the manner of ordinary milking operations.

The device embodies the preferred form of construction and arrangements of parts, which will be more fully hereinafter set forth and subject to a wide range of modification in the proportions and details without departing from the scope of the invention.

Figure 1:
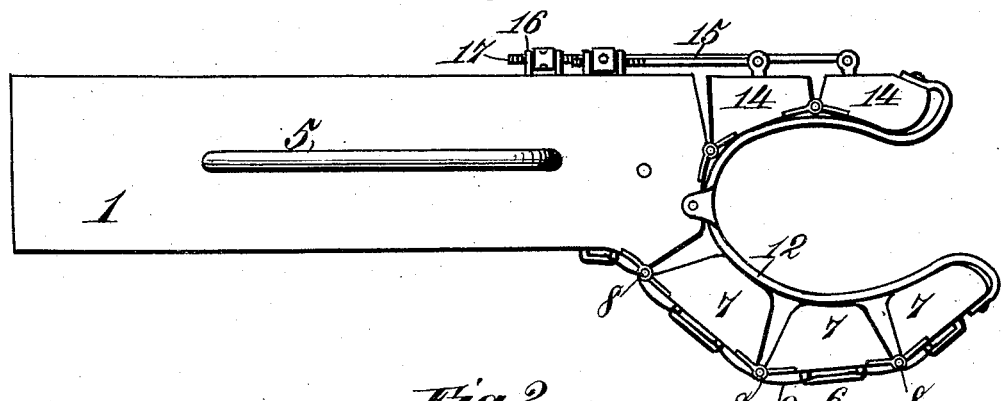
Figure 2:
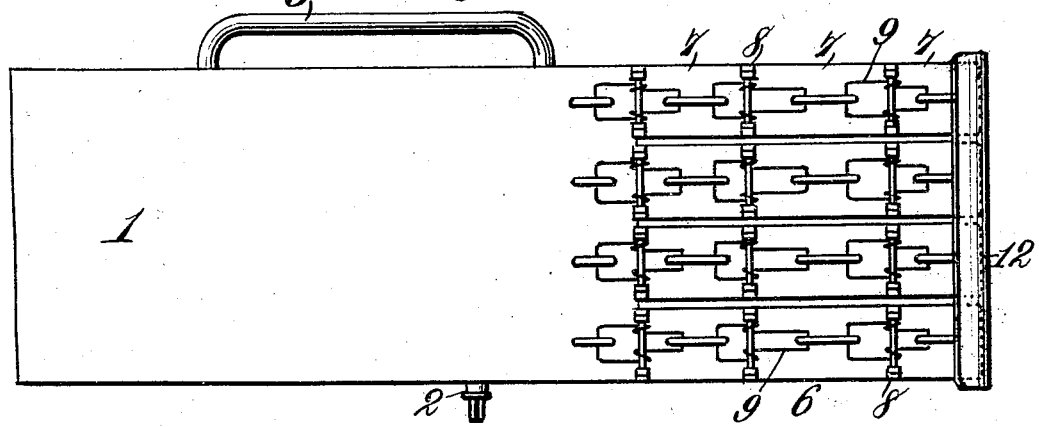
Figure 3:
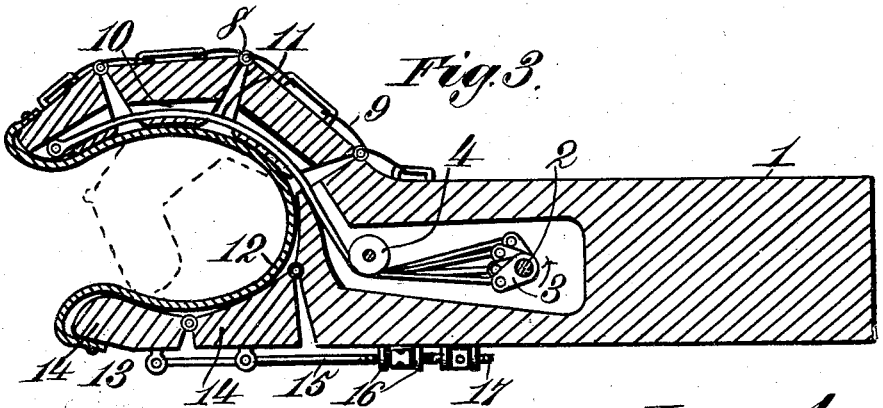

In the drawings, Figure 1 is a plan view of a milking device embodying the features of the invention and looking toward the inner portion thereof. Fig. 2 is an outer side elevation of the device. Fig. 3 is a section taken longitudinally through the handle or holder and the movable members of the device to illustrate the mode of contracting the said members.

The numeral 1 designates a handle or shank which, for a part of its length at least, is tubular and has disposed therein a vertically-positioned crank-shaft 2, formed or provided with a number of cranks 3, the number of cranks being equal to the movable or contractible and expansible members of the device. This crank-shaft 2 may be operated by any suitable manual or other motive mechanism. The shank or handle 1 also has applied thereto a loop or other attaching means 5 for receiving a strap end to adapt at least two of the devices to be secured to opposite terminals of a suitable suspending-strap which is thrown over the back of the animal to hold the device in proper position relative to the teats. At times, if found desirable or necessary, more than two of the milking devices may be used, and at other times only one may be employed to pursue a milking operation.

A series of flexible fingers or digits 6 are held at the front extremity of the handle or shank 1 and are preferably four in number, each digit or finger being made up of a series of jointed sections 7, connected by hinges 8, and have outer spring-loops 9, which normally maintain the several sections 7 in positive relation to facilitate grasping or properly engaging a teat. The fingers or digits 6 are constructed of suitable yielding material, and each has an inner cavity 10, through which a tape 11 movably extends and is connected to its corresponding crank 3 of the crank-shaft 2, and all the tapes preferably pass over a guide-roller 4. The inner side of each complete finger across the joint will be preferably in the form of a continuous web 12, and as the material of which the several fingers are composed must have a yielding action or be sufficiently elastic to meet the contingencies of milking operations, especially in view of the necessary relaxation of the fingers, the web 12 across the inner portions of the joints of the sections will give sufficiently to permit the operation just stated against the resistance of the springs 9, which, as before set forth, always tend to restore the sections of the fingers to normal position. At the opposite side of the front extremity of the handle or shank is a single finger or digit 13, which acts as a brace or stop with relation to the fingers or digits 6, the latter operating similarly to the four main fingers of the human hand and the finger or digit 13 taking the place of the thumb. This digit or finger 13 is also made up of jointed sections 14, which are movably attached to each other by suitable means and also to the handle or shank, and connected thereto are adjusting-rods 15, which extend rearwardly over the adjacent side of the handle or shank and through lugs 16, between which the ends 17 are held and engage the rear ends of the said rods, which are suitably screw-threaded. By adjusting the rods the position of the finger or digit 13 may be changed to accommodate variations in the dimensions of teats. All of the fingers or digits 6 close equally around the teat engaged except the upper one, which is slightly in advance or projects inwardly a greater distance than those below for obvious reasons in the milking operation or to simulate the grasp of the human hand to insure a downdrawing and flow of milk through the teat.

In the operation of the device the fingers or digits 6 while open are placed around the teat, the finger or digit 13. being braced against an opposite portion of the latter. The crank-shaft 2 is then actuated, and tapes 11 are equally drawn rearwardly by the cranks 3 of said shaft, and the fingers or digits 6 are contracted and caused to surround the teat and exert a pressure sufficient to bring the milk down from the udder into and expel it from the teat. This contraction of the fingers or digits 6 is effected when the cranks 3 are being projected in a rearward direction, and as soon as said cranks begin to move forwardly the tapes are gradually relaxed, and the fingers automatically move outwardly and are restored to normal position by the springs 9.

The material of which the several parts of the improved milking device are composed may be varied at will, and likewise the mode of application to the teat may be modified to accommodate various contingencies that may arise. In some instances suitable mechanism may be attached to the crank-shaft 2 of the milking device for operating the same, and means may be employed for holding the handles or shanks 1 in a fixed position with respect to the teats engaged. This mechanism and means, however, is not essential to the operation of the milking device, as the latter is not limited to any particular mode of operating and applying the same.

At times it may be desirable to use more than one opposing finger or digit similar to that designated by the numeral 13 to accommodate variations in dimensions of teats. The invention is therefore to be understood as contemplating the use of more than one opposing finger or digit.

Having thus described the invention, what is claimed as new is—

1. A milking device having a series of contractible and relaxing fingers composed of jointed sections.

2. A milking device having a plurality of contractible and relaxing fingers, and means for operating said fingers inclosed within the latter.

3. A milking device having a plurality of contractible and relaxing fingers, and a finger having a fixed adjustable position and coöperating therewith.

4. A milking device having a plurality of fingers simulating the fingers of the human hand and composed of jointed sections, the finger representing the thumb being held in opposing or resisting position to the remaining fingers, which have a contracting and relaxing movement imparted thereto.

5. A milking device having a plurality of fingers made up of jointed sections, spring devices coöperating with said sections to relax the same and restore them to normal position, and means connected to the fingers for contracting them against resistance of the spring devices.

6. A milking device having a plurality of fingers made up of jointed sections provided with spring means for restoring them to normal position when relaxed, a resistance means coöperating with the first-named fingers, and means for contracting the latter fingers.

7. A milking device having a plurality of fingers provided with means for restoring them to normal position, tapes connected to the fingers for contracting the same, means for drawing the tapes to contract the fingers, and a resistance-finger coöperating with the contractible fingers and having a fixed adjusted position.

8. In a milking device, a plurality of contractible and expansible fingers, a resistance-finger coöperating therewith and arranged in opposition thereto, contracting-tapes attached to the fingers, and a crank-shaft having a series of cranks to which the tapes are secured.

9. A milking device having a plurality of contractible and expansible fingers, and a single resistance-finger having adjusting means connected thereto.

In testimony whereof I have hereunto set my hand in presence of two subscribing witnesses.

LEWIS GOODWIN HARPER.

Witnesses:
DAVIS HAUSE,
ADA J. TOWNSEND.